US008560298B2

(12) United States Patent
Kumaran et al.

(10) Patent No.: US 8,560,298 B2
(45) Date of Patent: Oct. 15, 2013

(54) NAMED ENTITY TRANSLITERATION USING COMPARABLE CORPRA

(75) Inventors: Arumugam Kumaran, Bangalore (IN); Raghavendra Udupa U, Bangalore (IN); Saravanan Krishnan, Bangalore (IN)

(73) Assignee: Microsoft Corporation, Redmond, VA (US)

( * ) Notice: Subject to any disclaimer, the term of this patent is extended or adjusted under 35 U.S.C. 154(b) by 921 days.

(21) Appl. No.: 12/255,372

(22) Filed: Oct. 21, 2008

(65) Prior Publication Data

US 2010/0106484 A1 Apr. 29, 2010

(51) Int. Cl.
*G06F 17/28* (2006.01)

(52) U.S. Cl.
USPC .................................. 704/4; 704/2

(58) Field of Classification Search
USPC .......................................... 704/2–8
See application file for complete search history.

(56) References Cited

U.S. PATENT DOCUMENTS

| 6,104,989 | A * | 8/2000 | Kanevsky et al. ................. 704/9 |
| 7,143,091 | B2 | 11/2006 | Charnock et al. |
| 7,249,013 | B2 * | 7/2007 | Al-Onaizan et al. ............... 704/9 |
| 7,366,654 | B2 * | 4/2008 | Moore ............................... 704/2 |
| 7,457,808 | B2 * | 11/2008 | Gaussier et al. ....................... 1/1 |
| 7,475,010 | B2 * | 1/2009 | Chao .............................. 704/10 |
| 7,983,903 | B2 * | 7/2011 | Gao ................................ 704/10 |
| 2003/0191625 | A1 * | 10/2003 | Gorin et al. ....................... 704/1 |
| 2003/0229634 | A1 | 12/2003 | Li |
| 2005/0049852 | A1 * | 3/2005 | Chao ................................. 704/9 |
| 2005/0209844 | A1 * | 9/2005 | Wu et al. ........................... 704/2 |
| 2006/0136410 | A1 * | 6/2006 | Gaussier et al. .................. 707/5 |
| 2006/0217962 | A1 * | 9/2006 | Asano ............................... 704/4 |
| 2007/0011132 | A1 * | 1/2007 | Zhou et al. ........................ 707/1 |
| 2007/0022134 | A1 | 1/2007 | Zhou et al. |
| 2007/0067285 | A1 | 3/2007 | Blume et al. |
| 2007/0174267 | A1 * | 7/2007 | Patterson et al. ................. 707/5 |
| 2007/0282598 | A1 * | 12/2007 | Waelti et al. .................... 704/10 |
| 2008/0126076 | A1 * | 5/2008 | Ming et al. ....................... 704/4 |
| 2009/0070095 | A1 * | 3/2009 | Gao ................................. 704/2 |
| 2009/0319257 | A1 * | 12/2009 | Blume et al. ..................... 704/7 |
| 2010/0004925 | A1 * | 1/2010 | Ah-Pine et al. .................. 704/9 |

OTHER PUBLICATIONS

"International Search Report", Mailed Jun. 3, 2010, Application No. PCT/US2009/061352, Filed Date Oct. 20, 2009, pp. 1-12.
Hassan, et al., "Improving Named Entity Translation by Exploiting Comparable and Parallel Corpora", Retrieved at <<http://www.computing.dcu.ie/~hhasan/ranlp07.pdf >>, Conference on Recent Advances in Natural Language Processing, AMML Workshop, 2007, pp. 1-6.

(Continued)

*Primary Examiner* — Douglas Godbold
(74) *Attorney, Agent, or Firm* — Joseph R. Kelly; Kelly, Holt & Christenson

(57) ABSTRACT

A document in a first language and an additional document in a second language may be reviewed. It may be determined if the additional document is sufficiently similar to the document. If the additional document is determined sufficiently similar to the document, a named entity in the document may be selected. The method may search for a similar named entity by comparing the named entity to a word in the additional document and determining if the named entity and word are sufficiently similar. If a similar word to the named entity is located, the named entity and the similar named entities may be stored as name entity transliterations.

20 Claims, 3 Drawing Sheets

(56) References Cited

OTHER PUBLICATIONS

Sproat, et al., "Named Entity Transliteration With Comparable Corpora", Retrieved at << http://www.mt-archive.info/Coling-ACL-2006-Sproat.pdf >>, Proceeding of the 21st International Conference on Computattional Linguistics and 44th Annual Meeting of the ACL, Jul. 2006, pp. 73-80.

Shinyama et al., "Named Entity Discovery Using Comparable News Articles," http://cs.nyu.edu/~sekine/papers/coling04-shinyama.pdf, 2004.

Jiang et al., "Named Entity Translation with Web Mining and Transliteration," http://www.ijcai.org/papers07/Papers/IJCAI07-263.pdf, 2007.

Shao et al., "Mining New Word Translations from Comparable Corpora," http://www.comp.nus.edu.sg/~nght/pubs/coling04.pdf, 2004.

Hassan et al., "Improving Named Entity Translation by Exploiting Comparable and Parallel Corpora," http://pers-www.wlv.ac.uk/~in8113/amml07/papers/2.pdf, 2007.

Li et al., Mining Community Structure of Named Entities from Web Pages and Blogs, American Association for Artificial Intelligence, 2006, http://www.cs.uic.edu/~xli3/caaw06.pdf, 2006.

Notice of the First Office Action (PCT Application in the National Phase), including English translation, for Chinese Patent Application No. 200980142526.0, dated Oct. 29, 2012, 7 pages.

Extended European Search Report Application No. 09 82 2578 dated Jul. 6, 2013, 12 pages.

K. Saravanan et al., "Some Experiments in Mining Named Entity Transliteration Pairs from Comparable Corpora", Proceedings of the 2nd International Workshop on Cross Lingual Information Access., Jan. 11, 2008, pp. 26-33.

Alexandre Klementiev et al., "Weakly Supervised Named Entity Transliteration and Discovery from Multilingual Comparable Corpora", Proceedings of the 21st International Conference on Computational Linguistics and 44th Annual Meeting of the ACL, Jul. 17, 2006, pp. 817-824.

Pascale Fung et al., "Multi-level Bootstrapping for Extracting Parallel Sentences from a Quasi-comparable Corpus", Coling '04 Proceedings of the 20th International Conference on Computational Linguistics, vol. Article No. 1051, Aug. 23, 2004, 7 pages.

Chris Quirk et al. "Generating Models of Noisy Translations with Applications to Parallel Fragment Extraction", Proceedings of MT Summit XI, European Association for Machine Translation, Sep. 10, 2007. 8 pages.

* cited by examiner

NAMED ENTITY TRANSLITERATION USING COMPARABLE CORPRA

BACKGROUND

This Background is intended to provide the basic context of this patent application and it is not intended to describe a specific problem to be solved.

Named entities form a significant fraction of query terms in Cross Language Information Retrieval (CLIR) and have substantial impact on the performance of cross language information retrieval systems. In Machine Translation (MT), many of the out-of-vocabulary words are Named entities. However, bilingual dictionaries lack sufficient coverage of Named entities and Machine Transliteration systems often produce incorrect transliterations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system of mining multilingual named entity transliterations is disclosed. A document in a first language may be reviewed and an additional document in a second language may be reviewed. It may be determined if the additional document is sufficiently similar to the document. If the additional document is determined sufficiently similar to the document, a named entity in the document may be selected. The method may search for a similar named entity by comparing the named entity to a word in the additional document and determining if the named entity and word are sufficiently similar. If a similar word to the named entity is located, the named entity and the similar named entities may be stored as name entity transliterations.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
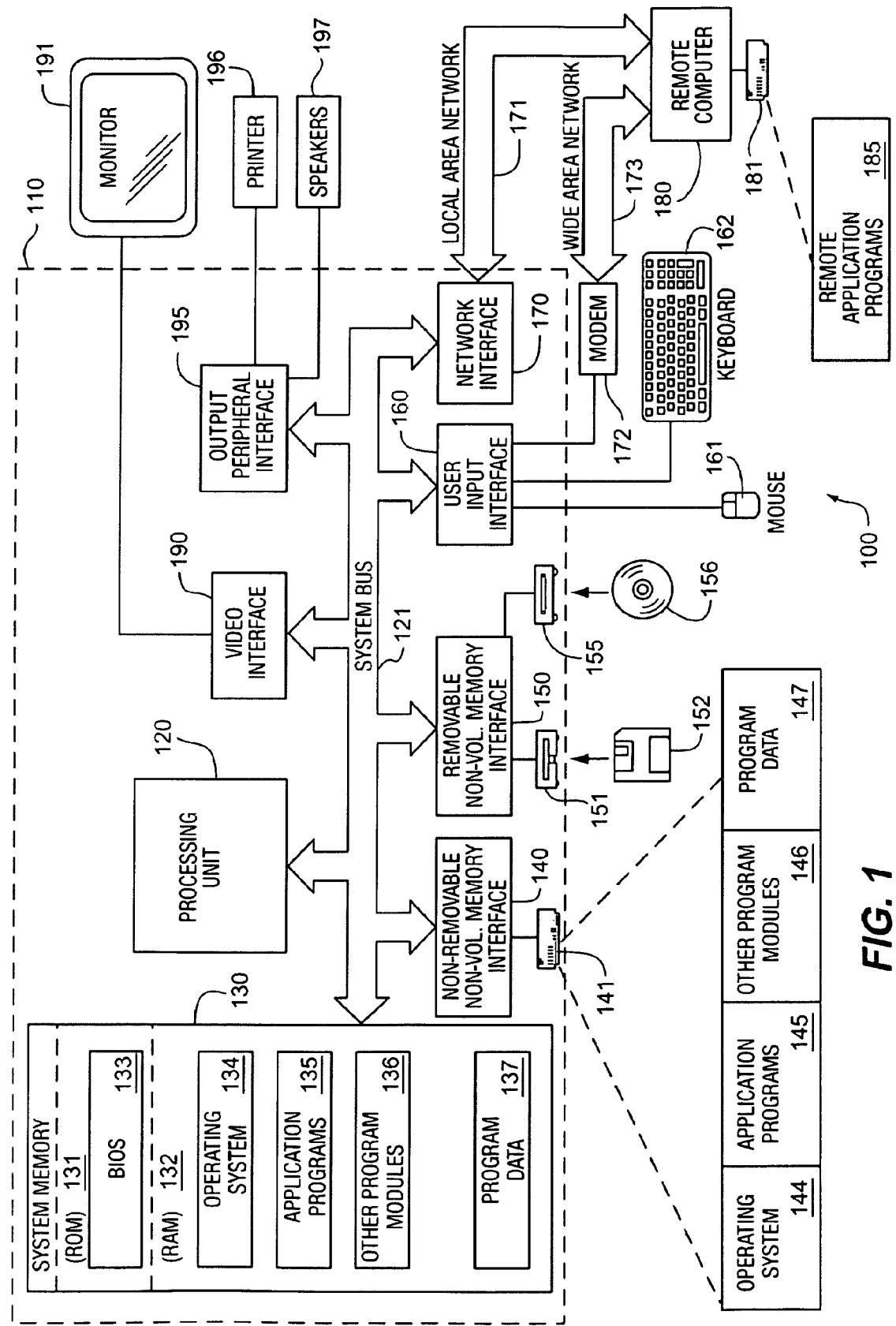
FIG. 1 is an illustration of a portable computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
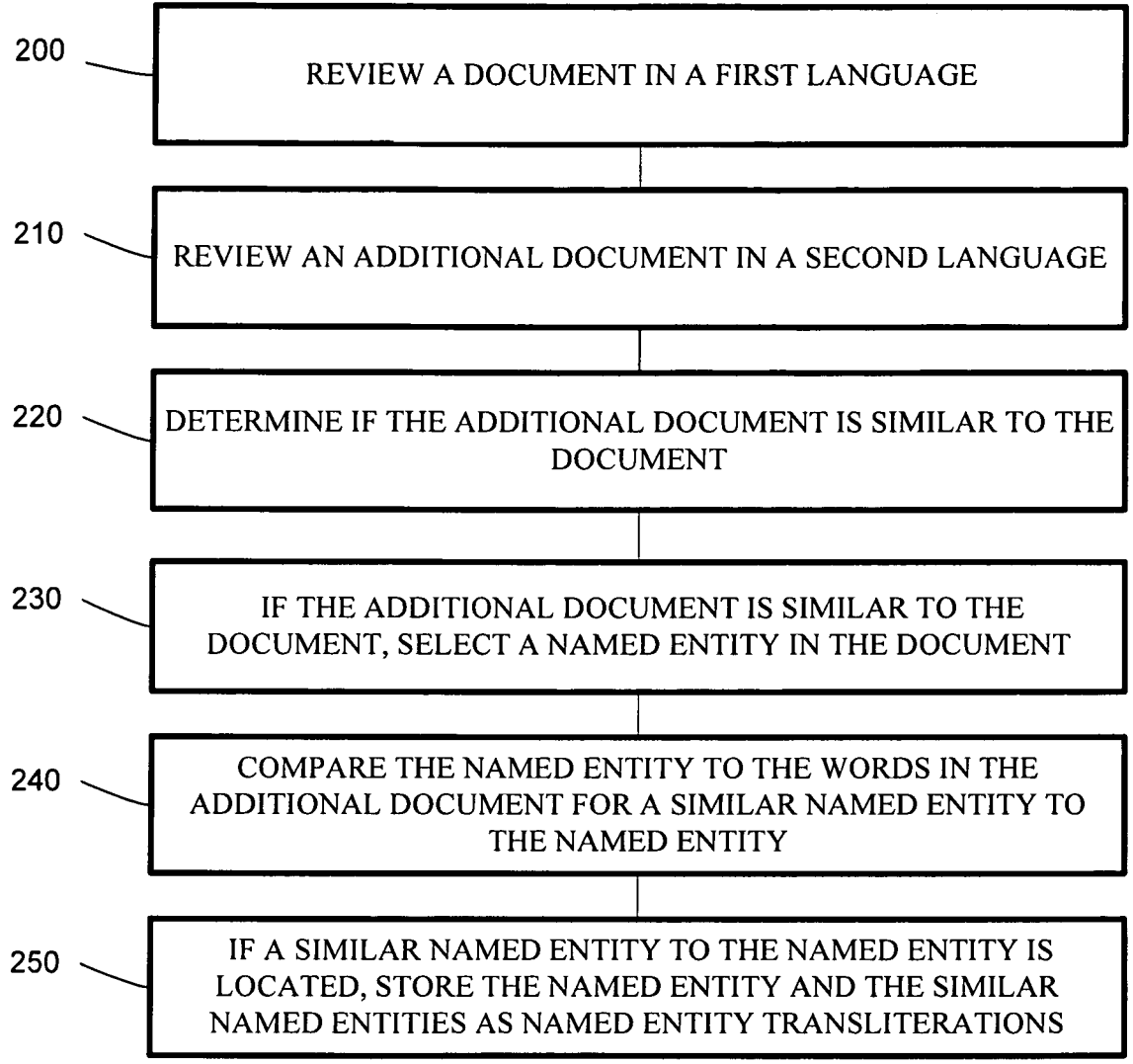
FIG. 2 is an illustration of a method of mining multilingual named entity transliteration.

FIG. 2 may illustrate a method of mining documents for multilingual named entity transliterations. Named Entities (NEs) form significant fraction of query terms in Information Retrieval (IR) systems and may have a substantial impact on their performance. They may be even more important in Cross Language Information Retrieval (CLIR). Further, Named Entities also play a significant role in the performance of Machine Translation (MT) systems, as many of the out-of-vocabulary words are in fact Named entities. Whereas Named Entities are critical to the success of the cross language information retrieval systems and influence significantly the machine translation performance, the bilingual dictionaries—whether hand-crafted or statistical—offer only limited support as they do not have sufficient coverage of Named Entities. New Named Entities are introduced to the vocabulary of a language by news articles and the Internet every day. The alternative approach of machine transliteration often produces misspelled or incorrect transliterations, which act as noise in cross language information retrieval and degrade translation quality in MT.

In the recent times, the availability of news articles in multiple languages simultaneously, has spurred interest in a promising alternative to Named Entities transliteration, particularly, the mining of Named Entity Transliteration Equivalents (NETEs) from such news corpora. Formally, comparable news corpora are time-aligned news stories in a pair of languages, over a reasonably long duration. Many news organizations around the world produce such news content daily in multiple languages. Named Entity Transliteration Equivalents mined from comparable news corpora could be valuable in many tasks including CLIR and MT, to effectively complement the bilingual dictionaries, and machine transliteration systems.

News stories are typically rich in Named Entities 310 and therefore, comparable news corpora are fertile fields of Named Entity Transliteration Equivalents. The large quantity and the perpetual availability of news corpora in many of the world's languages, signal a vast, valuable and inexhaustible data source for mining Named Entities 310 equivalents, provided an effective way of mining them from such corpora could be devised. This opportunity is one of the drivers of the described method and system.

Effective mining of Named Entity Transliteration Equivalents from large comparable corpora poses several challenges: Firstly, the identification and verification of Named Entities may call for linguistic tools and resources that may not be available in many languages. Secondly, the vast majority of the Named Entities in comparable corpora are very sparse, requiring little dependence on the frequency signatures of Named Entities in the corpora. Thirdly, the mining method must restrict the generation of candidates, to be computationally effective when mining larger corpora; in addition, the restriction of candidates will reduce degradation of precision by false positives. Finally, it is important to use little language-specific knowledge to make the mining effective across languages.

This application introduces a novel method, called MINT, for effective mining of Named Entity Transliteration Equivalents from large comparable corpora, addressing all the challenges listed above. MINT assumes the availability of Name Entity Recognizer (NER) for just one language, and hence is applicable to mining Named Entity Transliteration Equivalents even from resource-poor languages, when paired with a language where a name entity recognizer may be available. In response, this application does the following:

Recognizes that if news articles with similar content are known a priori, then they may be mined effectively and exhaustively.

Demonstrates empirically that MINT, using the above insight and Cross Language Information Retrieval techniques, can mine significantly better than the state of the art, even when similar articles are not known a priori, such as, in normal comparable corpora.

Demonstrates its effectiveness over many corpora, with different characteristics.

Finally, this application demonstrates the method is language-independent by describing its performance on several comparable corpora between diverse set of languages (namely, Russian, Hindi, Kannada and Tamil) from three distinct linguistic families (namely, Slavic, Indo-European and Dravidian).

Figure 3:
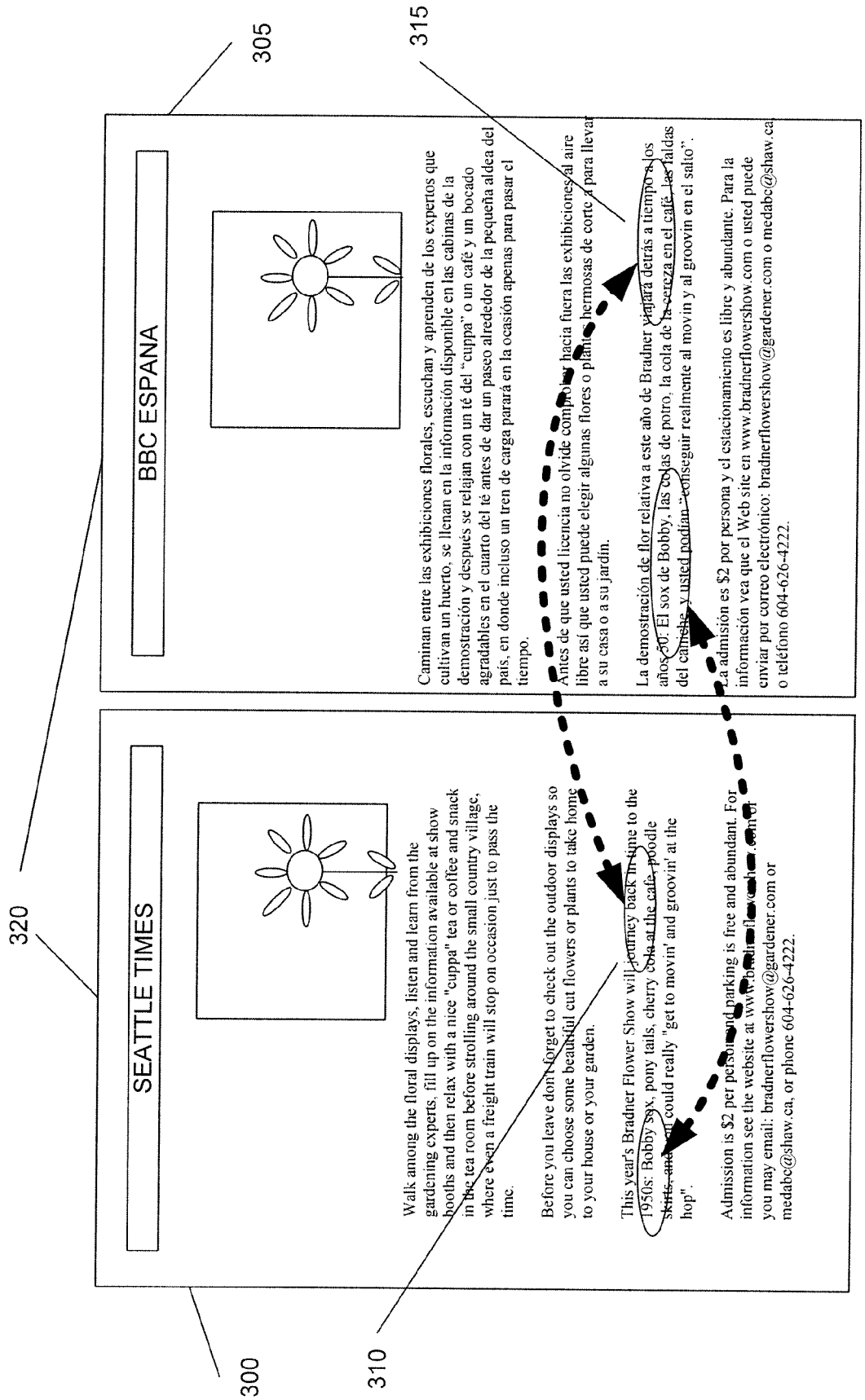
FIG. 3 is an illustration of comparable corpra.

The MINT method is based on a key insight that news articles in multiple languages with similar content must contain highly overlapping set of named entities, as news is about events involving people, places, organizations and other Named Entities. Multilingual news articles reporting the same news event must mention the Named Entities in the respective languages, and hence, may be expected to yield Named Entity Transliteration Equivalents richly. FIG. 3 illustrates the Named Entity Transliteration Equivalent in a pair of similar articles in Hindi and English published by BBC. Analysis of 200 pairs of similar news articles published by one source, in English and Tamil, and found that 87% of the single word named entities 310 in English side had at least one equivalent in the Tamil side. The MINT method leverages this empirically backed insight to mine named entity transliteration equivalents from such corpora.

MINT may have two stages. In the first stage, documents are compared to identify, for every document in the source side, the set of documents in the target side with similar content. Once similar documents are identified, they are given as the input to the second stage, where Named Entity Transliteration Equivalents are mined from the documents.

Referring again to FIG. 2, at block 200 a document in a first language 300 (FIG. 3) may be reviewed. Ideally, the document with contain some Named Entity Transliteration Equivalents of interest. The document may be selected as it contains a named entity transliteration equivalent that is troublesome or it may be a sequential search through news stories that have been written for a particular day. Of course, other methods of selecting the document in the first language are possible and are contemplated.

At block 210, an additional document in a second language 305 may be reviewed. Ideally, the additional document 305 may be selected in a manner that it also will have Named Entity Transliteration Equivalents. For example, if the document is a sports story, it makes little sense to review a scientific paper as the additional document as the probability of there being a similar Named Entity Transliteration Equivalent between the document 300 and the additional document 305 may be low.

At block 220, it may be determined if the additional document 305 is similar to the document 300. The determination may be created in a variety of ways. In some embodiments, a cross language similarity score is calculated using a cross language document similarity model. The cross-language document similarity model may measure the degree of similarity between a pair of documents in source and target languages. The negative Kullback-Leibler (KL) divergence between the document and the additional document probability distributions may be used as the similarity measure.

In probability theory and information theory, the Kullback-Leibler divergence (also information divergence, information gain, or relative entropy) is a non-commutative measure of the difference between two probability distributions P and Q. KL measures the expected difference in the number of bits required to code samples from P when using a code based on P, and when using a code based on Q. Typically P represents the "true" distribution of data, observations, or a precise calculated theoretical distribution. The measure Q typically represents a theory, model, description, or approximation of P.

In this application, given two documents DS 300, DT 305 in source and target languages respectively, with Vs, Vt, denoting the vocabulary of source and target languages, the similarity between the two documents 300, 305 may be given by $-KL(Ds\|Dt)$:

$$\sum_{w_T \in V_T} P(w_T \mid D_S) \log \frac{p(w_T \mid D_T)}{p(w_T \mid D_S)}$$

where p(w|D) is the probability of word w being in document D. As there is interest in finding those target documents 305 which are similar to a given source language document 300, the numerator may be ignored as it is independent of the target language document. Finally, expanding $p(w_t|Ds)$ as $$\sum_{w_S \in V_S} p(w_S \mid D_S) p(w_T \mid w_S),$$

the cross language similarity score may be specified as follows:

$$CrossLanguageDocumentSimilarity(D_S, D_T, MD) =$$
$$\sum_{w_T \in V_T} \sum_{w_S \in V_S} p(w_S D_S) p(w_T \mid w_S) \log p(w_T \mid D_T)$$

In pseudo-code, the comparison of documents 300 305 may progress as follows:

Input: Comparable news corpora ($C_S$, $C_T$) in languages (S,T)
    Crosslanguage Document Similarity Model MD for (S,T)
    Threshold score a.
Output: Set $A_{S,T}$ of pairs of similar articles ($D_S$, $D_T$) from ($C_S$, $C_T$).
1 $A_{ST} \leftarrow \emptyset$;    //Set of Similar articles ($D_S$,$D_T$)
2 for each article $D_S$ in $C_S$ do
3    XS←∅;    //Set of candidates for $D_S$.
4    for each article $d_T$ in $C_T$ do
5        score = CrossLanguageDocumentSimilarity($D_S$,$d_T$,MD);
6        if (score ≥ α) then $X_S \leftarrow X_S \cup (d_T, score)$;
7    end
8    $D_T$ = BestScoringCandidate($X_S$);
9 if (DT≠∅) then $A_{ST} \leftarrow A_{ST} \cup (D_S,D_T)$;
10 end As can be seen from the pseudo code, a plurality of additional documents 305 may be compared to the document 300. In some embodiments, the additional documents 305 are pre-screened to ensure that only additional documents 305 that are likely to have words 315 similar to the Named Entities 310 that are reviewed. As an example, a document 300 focused Michael Phelps likely will be sports related. Using this knowledge, the types of additional documents 305 that are reviewed may be reduced. A similarity score may be calculated for each additional document-document pair 320 (the original source document 300 and each individual additional document 305) and the pair 320 with the greatest similarity may be used as the document-additional document pair 320 to be further analyzed.

At block 230, if the additional document 305 is sufficiently similar to the document 300, a Named Entity 310 in the document may be selected. For example, the swimmer Michael Phelps may be an American name and may be easy to recognize in many sports articles. However, Michael Phelps may be difficult to create in other languages. Accordingly, Michael Phelps may be an example of a Named Entity 310 that the method may attempt to mine.

If a plurality of additional documents 305 have been compared to the document 300, the document 300-additional document 305 pair 320 with the highest determined similarity may be chosen as the selected pair 320 to be further analyzed. If no pair 320 reaches a sufficient similarity score, no additional document 305 may be returned and the method may end or begin again with new documents.

At block 240, the Named Entity 310 may be compared to the words 315 in the additional document 305 for a similar word 315 to the Named Entity 310. As can be imagined, words may also be phrases or fragments or entity names. The method may work on each pair of articles (Ds, Dt) 320 in a collection $A_{s,t}$ and produces a set $P_{s,t}$ of Named Entity Transliteration Equivalents. Each pair ($\epsilon_s$, $e_T$) 320 in $P_{s,t}$ consists of a Named Entity $\epsilon_s$ 310 in language S, and a token $e_T$ 315 in language T, that are transliteration equivalents of each other. Furthermore, the transliteration similarity between $\epsilon_s$ 310 and $e_T$ 315, as measured by the transliteration similarity model MT, may be at least $\beta >= 0$.

In pseudo code, one embodiment of the method may progress as follows:

Input:
    Set $A_{ST}$ of similar documents ($D_S$, $D_T$) in languages (S,T)
    Transliteration Similarity Model MT for (S,T)
    Threshold score β.
Output: Set $P_{S,T}$ of NETEs ($s_S$, $s_T$) from $A_{ST}$;
1 $P_{ST} \leftarrow \emptyset$;
2 for each pair of articles ($D_S$, $D_T$) in $A_{ST}$ do
3    for each named entity $s_T$ in $D_s$ do
4        $Y_S \leftarrow \emptyset$; // Set of candidates for $s_S$
5        for each candidate $e_T$ in $D_T$ do
6            score = TransliterationSimilarity($s_S$,$e_T$,MT);
7            if (score ≥ β) then $Y_S \leftarrow Y_S \cup (e_T, score)$;
8        end
9        $s_T$ = BestScoringCandidate($Y_S$);
10        if ($s_T$≠null) then $P_{ST} \leftarrow P_{ST} \cup (s_S,e_T)$;
11    end
12 end The transliteration similarity model measures the degree of transliteration equivalence between a source Named Entity 310 and a target language word 315. A logistic function may be employed as a transliteration similarity model MT, as follows:

$$TransliterationSimilarity(\varepsilon_S, e_T, MT) = \frac{1}{1 + e^{-w \cdot \phi(\varepsilon_S, e_T)}}$$

where $\emptyset(\epsilon_S, e_T)$ is the feature vector for the pair ($\epsilon_S$, $e_T$) and w is the weights vector. The transliteration similarity may take a value in the range [0 . . . 1]. The features employed by the model may capture interesting cross-language associations observed in ($\epsilon_S$, $e_T$), such as, the occurrence of certain character sequences, couplings of substrings of $\epsilon_S$ and $e_T$, monotonicity of alignment of characters and difference in the number of characters in the two strings. The weights vector w is learned discriminatively over a training corpus of known transliteration equivalents. Of course, other ways of determining the similarity of named entities 310 and word 315 may be possible and are contemplated.

In some embodiments, all the words 315 in the additional document 305 are compared to the Named Entities 310 from the document 300. In another embodiment, the additional document 305 is scanned and many terms are removed from the analysis. For example, articles in the English language such as "the", "a", "an" are very unlikely to be part of the Named Entities 310 so these words may not be analyzed. In addition, it is unlikely there is a verb in the Named Entities 310 so verbs may not be analyzed. As yet another example, it is unlikely that adjectives are part of the Named Entities 310 so adjective may also not be analyzed. Further sifting of the words 315 in the additional document 305 are possible and are contemplated. As a result, the number of words 315 in the additional document 305 that are compared to the named entities 310 may be quite low and should be quite targeted.

At block 250, if a similar word 315 to the Named Entity 310 is located, the Named Entity 310 and the similar word 315 may be stored as named entity transliterations. If a plurality of words 315 have been compared to the named entity, the word 315-named entity 310 pair with the highest determined similarity may be chosen as the named entity transliterations. If no pair reaches a sufficient similarity score, no word 315 may be returned as a transliteration of the Named Entity 310.

The transliteration may then be used for a variety of purposes. In one embodiment, translation software may use the transliterations to improve translations. In another embodiment, the transliteration may be used in search software to assist searching for relevant results in a plurality of languages. Of course, other uses are possible and are contemplated.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of mining multilingual named entity transliteration comprising:
    obtaining a document in a first language;
    obtaining a plurality of additional documents, each additional document being in a second language that is different than the first language;
    calculating a first probability distribution of the document based on words in the document in the first language;
    for each additional document of the plurality of additional documents,
        calculating a second probability distribution of the additional document based on words in the additional document in the second language; and
        calculating a cross language similarity score based on the first probability distribution of the document in the first language and the second probability distribution of the additional document in the second language;
    selecting at least one of the additional documents based on a comparison of the cross language similarity scores calculated for the plurality of additional documents;
    selecting a named entity in the document;
    searching the selected additional document to identify a word in the selected additional document as a corresponding named entity by comparing the named entity to a one or more words in the selected additional document; and
    storing the named entity and the identified word as named entity transliterations.

2. The method of claim 1, wherein selecting the additional document comprises selecting the document pair with the highest cross language similarity score.

3. The method of claim 1, wherein searching for a similar named entity comprises calculating a cross language similarity score for the word and the named entity.

4. The method of claim 3, wherein the cross language similarity score for the word and the named entity measures the degree of transliteration equivalence between the named entity and the word.

5. The method of claim 4, wherein the cross language similarity score is calculated for a plurality of named entity pairs wherein named entity pairs comprise the named entity and the word in the additional document.

6. The method of claim 5, wherein searching the selected additional document to identify the word comprises:
    generating a group of words from the selected additional document by removing prepositions, verbs and adjectives from the selected additional document; and
    sequentially selecting words from the group of words and comparing features of each word to the named entity.

7. The method of claim 6, wherein the named entity pair that has the cross language score at a maximum is selected as transliterations of each other.

8. The method of claim 1, wherein calculating the first probability distribution comprises:
    determining a probability of a word in the first language being in the document.

9. The method of claim 8, wherein calculating the second probability distribution comprises:
    determining a probability of a word in the second language being in the additional document.

10. A computer readable hardware storage medium storing computer executable instructions, which, when executed using a computer, perform a method of mining multilingual named entity transliteration, the method comprising:
    reviewing a document in a first language;
    reviewing an additional document in a second language that is different than the first language;
    calculating a cross language similarity score between the document and the additional document;
    comparing the cross language similarity score to a threshold;
    selecting a named entity in the document;
    searching for a sufficiently similar named entity in the additional document, comprising:
        obtaining a group of words from the additional document by scanning the additional document to identify words of a given type, wherein the words of the given type are omitted from the group of words;

for each word in the group of words, calculating transliteration equivalence between the named entity and the word based on a feature vector for the named entity and the word in the additional document; and selecting a word from the group of words based on the calculated transliteration equivalence; and storing the named entity and the selected word as named entity transliterations.

11. The computer storage medium of claim 10, wherein the cross language similarity score is calculated using a Kullback-Leibler divergence.

12. The computer storage medium of claim 11, wherein the cross language similarity score is calculated for a plurality of document and additional document pairs and selecting the document pair with the highest similarity score.

13. The computer storage medium of claim 10, wherein a cross language similarity score is calculated for a plurality of named entity pairs wherein named entity pairs comprise the named entity and the word in the additional document.

14. The computer storage medium of claim 10, wherein the named entity pair that has the cross language score at a maximum is selected as transliterations of each other.

15. The computer storage medium of claim 10, wherein searching for a sufficiently similar named entity in the additional document does not require a name entity recognizer for the second language.

16. The computer storage medium of claim 10, wherein the given type comprises at least one of prepositions, verbs, and adjectives.

17. The computer storage medium of claim 16, wherein obtaining the group of words comprises omitting all prepositions, verbs and adjectives from the additional document.

18. A computer system comprising:
a processor;
one or more computer storage media storing executable instructions, which, when executed by the processor, configure the computer system to:
review a document in a first language;
review an additional document in a second language;
calculate a probability distribution of the document based on words in the document in the first language;
calculate a probability distribution of the additional document based on words in the additional document in the second language;
determine if the additional document is sufficiently similar to the document by calculating a cross language similarity score using a Kullback-Leibler divergence between the probability distributions of the document and the additional document, and comparing the cross language similarity score to a threshold;
if the additional document is determined to be sufficiently similar to the document:
select a named entity in the document;
search for a sufficiently similar named entity comprising comparing the named entity to a word in the additional document;
if a sufficiently similar word to the named entity is located, store the named entity and the similar word as named entity transliterations.

19. The computer system of claim 18, wherein the cross language similarity score is calculated for a plurality of document and additional document pairs, the computing system being further configured to:
select the document and additional document pair with the highest similarity score.

20. The computer system of claim 18, wherein the computing system is configured to search for a sufficiently similar named entity by calculating a cross language similarity score for the word and the named entity wherein:
the cross language similarity score measures the degree of transliteration equivalence between the named entity and the word
the word in the additional document is sequentially selected from a group of words in the additional document wherein the group does not include prepositions, verbs or adjectives in the additional document;
wherein the cross language similarity score is calculated for a plurality of named entity pairs wherein named entity pairs comprise the named entity and the word in the additional document.

* * * * *